(12) United States Patent
Debreuille et al.

(10) Patent No.: US 6,517,788 B2
(45) Date of Patent: Feb. 11, 2003

(54) METHOD AND DEVICE FOR SEPARATING CAESIUM, STRONTIUM AND TRANSURANIUM ELEMENTS CONTAINED IN SODIUM WASTE

(75) Inventors: Marie-Françoise Debreuille, Marcoussis (FR); Nathalie Hubert, Paris (FR); Jean-Paul Moulin, Bois d'Arcy (FR)

(73) Assignee: Compagnie Generale des Matieres Nucleaires, Velizy Villacoubley (FR)

( * ) Notice: Subject to any disclaimer, the term of this patent is extended or adjusted under 35 U.S.C. 154(b) by 53 days.

(21) Appl. No.: 09/794,179

(22) Filed: Feb. 26, 2001

(65) Prior Publication Data

US 2002/0113020 A1 Aug. 22, 2002

(30) Foreign Application Priority Data

Mar. 3, 2000 (FR) .......................... 00 02764

(51) Int. Cl.⁷ .......................... C22B 60/00; C22B 26/00
(52) U.S. Cl. .......................... 423/11; 423/158; 423/166; 423/181; 423/184
(58) Field of Search .......................... 423/11, 158, 166, 423/184, 181

(56) References Cited

U.S. PATENT DOCUMENTS 3,343,914 A * 9/1967 Bray .......................... 423/166
4,432,893 A * 2/1984 Lee et al. .......................... 423/2
5,698,169 A * 12/1997 Hawthorne et al. .......................... 423/181

OTHER PUBLICATIONS

Tomiyasu et al., "Environmentally acceptable nuclear fuel cycle . . . " Progress in Nuclear Energy, 1997 (no month), 32(3/4), pp. 421–427.*

Lee, DD and Collins, JL. Continuous–Flow Stirred–Tank Reactor 20–L Demonstration Test: Final Report. Prepared by Oak Ridge Natl. Lab., Feb. 2000.

Salto, HH. Effect of Sludge Solids to Mono–Sodium Titanate (MST) Ration on MS–Treated Sludge. WSRC–TR–99–99342, Rev. 0, Dec. 1999.

* cited by examiner

*Primary Examiner*—Steven Bos
(74) *Attorney, Agent, or Firm*—Pearne & Gordon LLP

(57) ABSTRACT

The present invention relates to a method for the continuous separation of caesium, strontium and transuranium elements contained in sodium waste which comprises the use of NaTPB, and to a device for the implementation of this method.

The method of the invention comprises, in line, the following steps: (a) filling at least one of at least two feed tanks with the waste; (b) analysis of the content of $Cs^+$, $Sr^{++}$, $Na^+$ and transuranium elements in the waste; (c) pre-treatment, adapted in relation to analysis results, of the solution in the feed tank intended to insolubilise the strontium and transuranium elements; (e1) a first caesium separation treatment; and e1a) a second caesium separation treatment, the method being conducted in continuous manner by means of the alternate use of the feed tanks.

18 Claims, 2 Drawing Sheets

METHOD AND DEVICE FOR SEPARATING CAESIUM, STRONTIUM AND TRANSURANIUM ELEMENTS CONTAINED IN SODIUM WASTE

DESCRIPTION

1. Technical field

The present invention relates to a method for separating caesium, strontium and transuranium elements present in sodium waste, and to a device for implementing this method.

The present invention may, for example, be applied to the treatment of radioactive sodium waste derived from nuclear waste treatment.

In particular it provides the possibility of limiting the inventory of materials involved to separate or isolate the above-cited elements from the waste, of controlling and managing chemical reaction time, of conducting separation as a continuous process and of guaranteeing the safety of personnel and equipment throughout the separating process.

It also provides for optimum adjustment of the quantities of reagents added, and limits undesired chemical reactions due in particular to the instability of these reagents.

2. Prior art

A method for decontaminating alkaline waste of caesium, based on the insolubility of caesium tetraphenylborate, was implemented in a single precipitation reactor with a long stay time in conjunction with a liquid-solid separation by tangential filtration.

However, the reaction is very difficult to control since tetraphenylborate is unstable and implementation of the method is accompanied by a strong release of benzene and other unstable aromatic compounds in the reactor, jeopardising the safety of the method. Moreover, the quantity of reagents used is high and is reflected in the cost of the decontamination process.

DESCRIPTION OF THE INVENTION

The purpose of the present invention is precisely to overcome the above-cited disadvantages by providing a method to separate caesium, strontium and tranuranium elements contained in sodium waste, which entails the use of $TPB^-$.

The method of the invention comprises, in line, the following successive steps:

(a) filling at least one of two feed tanks with the waste, (b) analysis of the content of caesium, strontium and other transuranium elements present in the waste, (c) pre-treatment of the waste consisting of, in one of the feed tanks filled with the waste, mixing said waste with an insolubilising agent for strontium and transuranium elements in a quantity adapted in particular in relation to the analysis of step (b), mixing being conducted for a first stay time and at a first temperature that are adequate for insolubilising the strontium and transuranium elements, said pre-treated waste forming a first suspension.

(d) an optional separation step to separate, from the first suspension, the insolubilising agent bound to the strontium and the transuranium agents, and to obtain a first liquid phase, free of said insolubilising agent, containing the caesium and sodium in solution.

(e1) a first, continuous, caesium separation treatment conducted on the first suspension derived from step (c) or on the first liquid phase derived from step (d), consisting of:

firstly mixing, in a first precipitation reactor, said first suspension or said first liquid phase with $TPB^-$ in appropriate quantity relative in particular to the analysis of step (b), and to a first measurement of the caesium content made at step (f1) downstream from this first separation treatment, mixing being conducted for a second stay time and at a second temperature adequate to precipitate the caesium, contained in the first suspension or in the first liquid phase, with the $TPB^-$ and to limit degradation of the $TPB^-$, so as to obtain a second suspension containing, in suspension in a second liquid phase, the insoluble $TPB^-$ containing the $TPB^-$ bound to the caesium, and if present the insolubilising agent bound to the strontium and transuranium elements, and secondly, separating from the second suspension the insoluble $TPB^-$ containing the $TPB^-$ bound to the caesium, and if present the insolubilising agent bound to the strontium and transuranium elements, in order to obtain the second liquid phase, said first precipitation reactor being continuously supplied with $TPB^-$ and the first suspension or the first liquid phase through the alternate use of the different feed tanks for said supply, (f1) the first measurement of the caesium content remaining in said second liquid phase, (g) recovery of the insoluble $TPB^-$ containing the $TPB^-$ bound to the caesium, and if present of the insolubilising agent bound to the strontium and transuranium elements derived from the preceding steps, and optionally, (h) extraction treatment of the caesium bound to the recovered $TPB^-$.

The method of the invention may also, between steps (f1) and (g), comprise the following steps:

(e1a) a second continuous separation treatment of the caesium conducted on the second liquid phase derived from step e1) consisting of:

firstly mixing, in a second precipitation reactor, said second liquid phase with $TPB^-$ in appropriate quantity relative in particular to the first measurement of step f1) and to a second measurement of the caesium content made at step f1a) downstream from this second separation treatment, mixing being conducted for a third stay time and at a third temperature suitable for precipitating the caesium present in the second liquid phase with the $TPB^-$ and for limiting degradation of the $TPB^-$, such as to obtain a third suspension containing, in suspension in a third liquid phase, the $TPB^-$ bound to the caesium, and secondly, separating from the third suspension the insoluble $TPB^-$ containing the $TPB^-$ bound to the caesium in order to obtain said third liquid phase, said second precipitation reactor being continuously supplied with $TPB^-$ and the with the second liquid phase derived from the first separation treatment, (f1a) said second measurement of the caesium content in said third liquid phase.

$TPB^-$, for example in the form of sodium tetraphenylborate, may be used to extract caesium from a solution. However, this reagent is easily degraded into benzene and other aromatic products, in particular by radiolysis in contact with the radioactive elements present in the waste and by chemical reaction with various constituents of said waste. With the method of the present invention it is possible, among others, to better manage the caesium separation process using TPB⁻ than with the methods of the prior art, to control the quantity of TPB⁻ used and hence to limit benzene emissions.

If TPB⁻ is used in NaTPB form, persons skilled in the art will easily understand that the TPB⁻-precipitate recovered at step (e1) and optionally at step (e1a) also contains NaTPB.

With the present invention, it is possible to conduct the continuous separation of caesium, in particular in solid CsTPB form, from sodium waste while ensuring the necessary safety guarantees for the treatment of radioactive solutions.

At step b) of the method of the invention, analysis may be carried out using any technique known to persons skilled in the art to determine the quantity of each of the above-cited elements, for example by means of elementary analysis such as emission spectrometry, or for example by γ or β spectroscopy for caesium 137 ($^{137}$Cs).

Preferably, the first analysis is made after homogenisation of the waste in the feed tank. Homogenisation may be conducted mechanically.

Pre-treatment of the sodium radioactive waste at step c) makes it possible to insolubilise the strontium and transuranium elements using a first insolubilising agent. This agent is preferably chemically stable in the presence of the sodium waste and radioelements it contains. It is added in sufficient quantity to fix the above-cited elements. This quantity is determined and adjusted in relation to the analysis made at step b).

According to the invention, the insolubilising agent may be chosen from among any agent which adsorbs and precipitates strontium and transuranium elements, such as for example a titanate, a zeolite, barium sulphate or a mixture thereof. This agent may for example be monosodium titanate.

This agent may also be a mixture of different insolubilising agents, for example an insolubilising agent for strontium and an insolubilising agent for the transuranium elements.

According to the invention, the first stay time may be chosen in relation to the composition of the waste to be pre-treated, and to the nature of the insolubilising agent. In general, when using monosodium titanate (MST) it is for example approximately 12 to 36 hours, for example 24 hours.

The first temperature must allow insolubilisation of the strontium and transuranium elements. It may for example be 15 to 50° C.

The purpose of the, at least, two feed tanks is in particular to provide continuous supply to the first precipitation reactor of a homogenous feed of known composition. These tanks alternately carry out the two functions described above. In one of the tanks, for example, decontamination of the strontium and transuranium elements may be achieved by stirring a mixture of the waste to be decontaminated and monosodium titanate (MST) for a time that is sufficient for the residual content of soluble strontium and transuranium elements to be sufficiently low, for example ¹⁄₁₀₀ of the initial content. Stirring may be mechanical. The other tank, in which pre-treatment has already been conducted, is used to supply the first precipitation reactor.

With optional step d), the insolubilising agent bound to the strontium and transuranium elements may be separated from the first suspension, derived from step c), to obtain firstly the insolubilising agent bound to the strontium and transuranium elements, and secondly a first liquid phase free of said insolubilising agent containing the caesium and sodium in solution.

This separation step may, for example, consist of applying to the pre-treated waste a conventional solid-liquid separation method. This step may be conducted in the feed tanks or between the feed tanks and the first separating unit. Step e1) of the method of the invention may then be conducted on the first liquid phase derived from this step d).

At step e1), the first precipitation reactor may for example be continuously stirred and supplied firstly with the first suspension derived from one of the feed tanks or with the first liquid phase derived from step d), and secondly with a continuous, controlled flow of TPB⁻.

The reactor, stay time and precipitation temperature of the caesium are discussed in further detail below.

At step e1), the separation of the insoluble TPB⁻ containing the TPB⁻ bound to the caesium, and if present of the insolubilising agent bound to the strontium and transuranium elements, from the second liquid phase may be made by filtration.

Therefore, according to the invention, at step e1), the first precipitation reactor may be associated with first continuous filtration means fitted with a first continuous evacuation outlet for the insoluble TPB⁻ containing the TPB⁻ bound to the caesium derived from the first separation treatment, and if present for the insolubilising agent bound to the strontium and transuranium elements derived from the pre-treatment step, and with a second outlet for the continuous evacuation of the second liquid phase derived from this first separation treatment. In this case, said second suspension is continuously added from the first precipitation reactor into said filtration means for the continuous separation and evacuation, through said first outlet, of the insoluble TPB containing the TPB⁻ bound to the caesium, and if present of the insolubilising agent bound to the strontium and transuranium elements, and of the second liquid phase derived from this first separation treatment through said second outlet.

The second suspension may, for example, be continuously evacuated from the precipitation reactor by overflow, falling under gravity into a chute which supplies the filtration means.

The method of the present invention may also comprise a washing step of the precipitate with water or buffered water in the filters before clearing. The washing waste derived from this step may follow the corresponding liquid phases.

The filtration means may be frontal filtering means, for a example a rotating drum filter operating under a vacuum for example.

According to the invention, at step f1), the first measurement may be a line measurement of the caesium content remaining in the second liquid phase after the first separation treatment. This measurement may for example be made using a γ or β spectroscope for caesium 137. It is used, together with the analysis of step a), to adjust the quantity of TPB⁻ continuously added to the first precipitation reactor in order to limit excess of this reagent while optimising caesium precipitation.

The second liquid phase derived from the first separation treatment may be subjected to a second continuous, caesium separation treatment, for example if the sodium waste has a high caesium content and the first separation treatment does not lead to sufficient caesium separation. The first measurement used to control the caesium content in the second liquid phase derived from the first separation treatment may give an indication as to the utility of a second separation treatment.

According to a first variant of the method of the invention, the method may also comprise, between steps f1) and g), the steps e1a and f1a) described above. According to this first variant, the second separation treatment may be conducted in a precipitation reactor such as the one previously described.

At step e1a), the insoluble TPB⁻, containing the TPB⁻ bound to the caesium, may be separated by filtration.

Therefore, according to the invention, at step e1a) the second separation unit may be associated with second means of continuous filtration, fitted with a third outlet for the continuous evacuation of the insoluble TPB⁻ bound to the caesium derived from this second treatment, and with a fourth outlet for the evacuation of said third liquid phase derived from this second treatment. In this case, said third suspension may be continuously added to said filtration means to separate and evacuate in continuous manner, on one side via said third outlet the insoluble TPB⁻ containing the TPB⁻ bound to the caesium, and on the other side, via said fourth outlet, said third liquid phase.

In short, the second liquid phase may continuously supply the second precipitation reactor, and the second precipitation reactor may be associated with filtration means functioning according to the same principle as the first.

It is possible to add a small quantity of potassium ions to the second precipitation reactor in order to improve the efficacy of TPB⁻ precipitation of the caesium.

According to a second variant of the method of the invention, distinct from the first, since the level of radioactivity is lower in the second liquid phase than in the first liquid phase, the method may also comprise, between steps f1) and g), as second separation treatment, a step e1b) to separate the caesium from the second liquid phase with an adsorption treatment on an appropriate ion exchanger such as a silicotitanate or a resorcinol resin. This step e1b), as in the first variant, leads to obtaining a third liquid phase. The caesium content is measured, using the means already indicated, on the third liquid phase to verify caesium decontamination of the solution.

The third liquid phase derived from the second separation treatment of the method of the invention, whether of the first variant or second variant, forms a fraction decontaminated of the caesium, strontium and transuranium elements in the initial waste.

According to the invention, the second and third stay times are preferably limited to the minimum stay time required in order to obtain the desired level of caesium separation, and to prevent too considerable degradation of the TPB⁻. For example, they may irrespectively range from 30 minutes to 4 hours, for example between 30 minutes and 2 hours.

According to the invention, the first and second precipitation reactors may be thermostat controlled to control treatment temperature. For example, the second temperature and the third temperature suitable for precipitating the caesium may irrespectively range from 20 to 50° C.

According to the invention, at step f1a), the second measurement may be continuous measurement of the content of caesium remaining in the third liquid phase after the second treatment. It can be used in particular to adjust the quantity of TPB⁻ added to the second precipitation reactor as previously described. This measurement may be made as described above.

The crown of the first and second precipitation reactors and all the parts of the device for the implementation of this method in contact with TPB⁻, may swept by a flow of gas to prevent an accumulation of benzene. This gas may for example be nitrogen or air or a mixture of air and nitrogen, provided that the benzene concentration in the gas remains well below the flammability limit in this gas. If air is used, it may be supplemented by nitrogen.

According to the invention, the caesium being bound to the TPB⁻ when it is recovered at step g), it may be subjected to the extraction treatment of step h), said extraction treatment comprising for example destruction of the TPB ion. Destruction of the TPB⁻ ion is performed for example in a destroyer reactor for this ion with appropriate reagents such as formic acid and copper.

Therefore, according to one particular embodiment of the present invention, the precipitates derived from the first and optionally the second separation treatment may, for example, transit through a small-volume hydraulic guard and, by means of a rotary dispenser for example, then fall into one of two reactors for the destruction of the tetraphenylborate ion (TPB⁻). At the time when one of these destroyer reactors receives this mixture while being heated and supplied with appropriate reagents for the destruction of the TPB⁻ ion, the other reactor, already containing the mixture and the reagents is heated to exhaust the precipitate and solution of benzene and other degradation products of TPB⁻. Alternate operation of the two reactors allows for continuous destruction treatment. The benzene and other volatile degradation products derived from destruction of the tetraphenylborate ion may be carried off by steam; they may for example undergo counterflow washing in water, then be condensed and directed towards a benzene-destroying reactor, for example an incinerator.

The caesium, and if present the first insolubilising agent bound to the strontium and transuranium elements recovered after TPB⁻ destruction, could supply a vitrification facility. They may be vitrified for storage purposes as the majority of Na⁺ ions are carried away with the liquid phases.

The sodium waste may also contain potassium or other elements such as mercury. Since TPB⁻ fixes these elements also, it is necessary in this case to take into account their concentration in the waste to be treated in order to adapt the quantity of TPB⁻ at step e1), and in the first variant at step e1a). The first analysis can be used to determine the quantity of these elements and to adapt the separation treatment. The examples below illustrate this instance.

SHORT DESCRIPTION OF THE FIGURES

Figure 1:
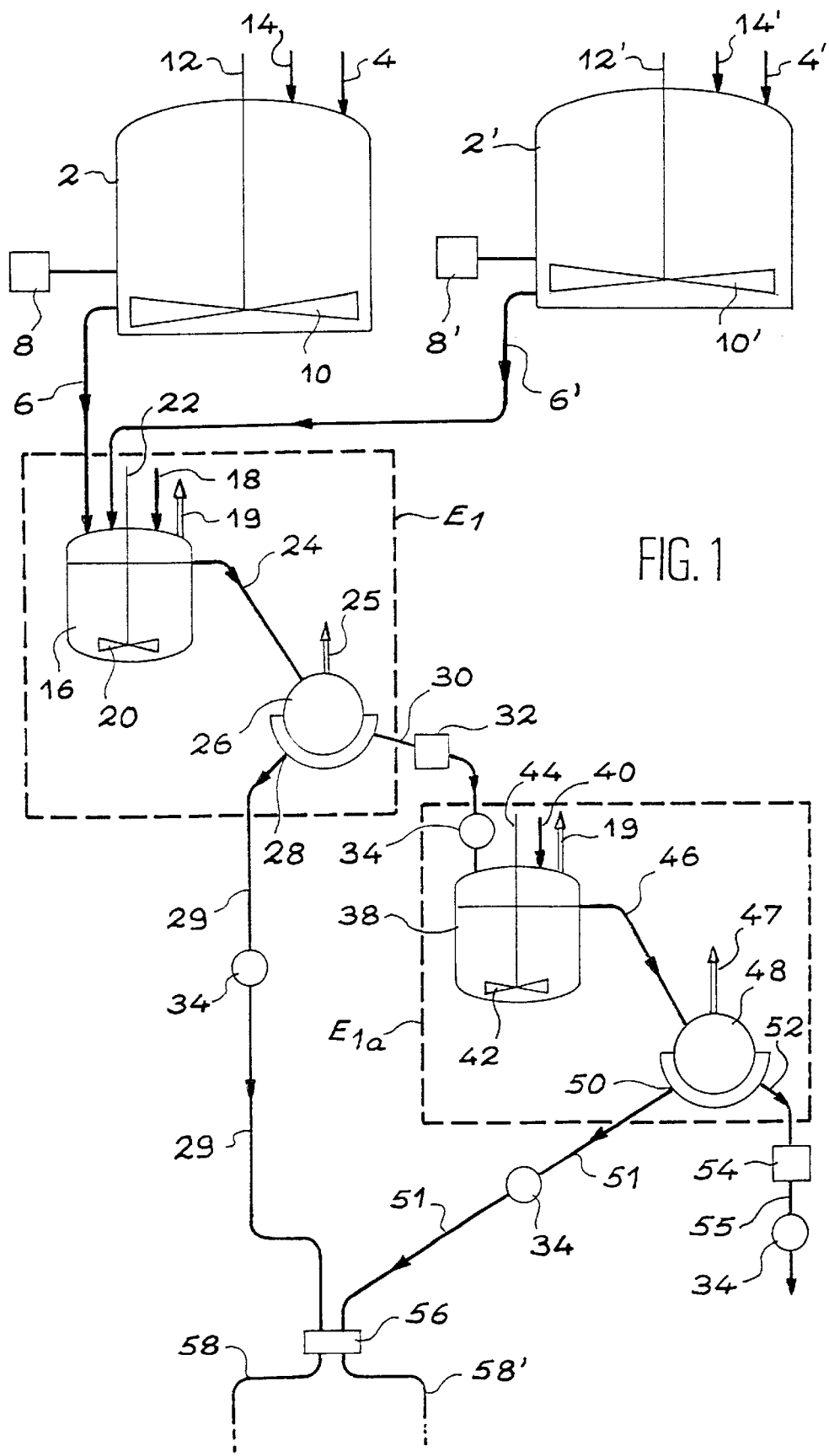
FIG. 1 is a diagram of a device for the implementation of the method of the present invention.

The invention also relates to a device for the implementation of the method of the invention.

This device comprises the following elements placed in line:

at least two feed tanks 2, 2', each comprising inlet means 4, 4' for adding sodium waste containing one or more products to be separated in the tank, inlet means 14, 14' for adding an insolubilising agent to the tank, evacuation means 6, 6' for evacuating the content of the tank to continuously supply a first separating unit E1, and stirring means 10, 10'.

analysis means 8, 8' to analyse the content of caesium, strontium and transuranium elements in the waste, positioned so as to analyse the content of the tanks, the first separating unit E1, comprising a first precipitation reactor 16, first filtration means 26, inlet means 18 to add the TPB⁻ to the reactor, the filtration means 26 being fitted with a first outlet 28 for the continuous evacuation of the insoluble TPB⁻ containing the TPB bound to the caesium separated by the first separation treatment, and a second outlet 30, for the continuous evacuation of a second liquid phase derived from the first separation treatment.

first measurement means 32 to measure the caesium content in the second liquid phase, placed downstream from the first continuous separation unit, recovery means 29 to collect the insoluble TPB⁻ containing the TPB⁻ bound to the caesium, and if present the insolubilising agent derived from the first outlet 28 for continuous evacuation, adjustment means connected to the analysis means and to the first measurement means which use the analysis and first measurement results to adjust the first separation treatment.

According to a first variant of the present invention, the device may also comprise, in line, downstream from the first measurement means 32 and upstream from a recovery means 51:

a second separating unit E1*a* comprising a second precipitation reactor 38, second filtration means 48, and inlet means 40 to add the TPB⁻ to the reactor, the filtration means 48 being fitted with a third outlet 50 for the continuous evacuation of a precipitate separated by a second separation treatment, and a fourth outlet 52 for the continuous evacuation of a third liquid phase derived from the second separation treatment, second measurement means 54 to measure the caesium content in the third liquid phase, placed downstream from the second separating unit, recovery means 51 to collect the insoluble TPB⁻ containing the TPB⁻ bound to the caesium, the adjustment means then also being connected to the second measurement means to adjust the second separation treatment.

According to a second variant of the present invention, distinct from the first variant, the device may also comprise, in line, downstream from the first measurement means 32 and upstream from the recovery means 51, an appropriate ion exchanger. This appropriate ion exchanger is of a type known to persons skilled in the art for the extraction of caesium from a solution, for example it may be an exchanger such as the one cited above.

The functions of the different parts of this device were described above.

The adjustment means connected to the analysis means and to the first, and in the first variant to the second measurement means, are used to adapt the separation treatments in relation to the analyses and measurements made. The first analysis and the first measurement, and in the first variant the second measurement, may be used to adjust the quantity of TPB⁻ added to the first, and in the first variant to the second precipitation reactor 16, 38, to precipitate the caesium and, if present, the potassium and/or mercury.

In this device, the first precipitation reactor 16, and in the first variant the second precipitation reactor 38, may be thermostat controlled.

The filtration means 26, 48 may be vacuum rotating-drum filters.

The device may also comprise barometric guards 34 or hydraulic guards placed downstream from each vacuum rotating-drum filter. These barometric guards are used to place the vacuum filtration means in communication with the precipitation reactors and TPB destruction reactors under slightly reduced pressure.

The device preferably comprises mechanical stirring means 10, 10', 20, 42 in the tanks and in the precipitation reactors.

The recovery means 29 and 51 may for example be ordinary ducts.

The device may also comprise extraction means 60, 60' to extract the caesium bound to the TPB⁻ recovery means 29, 51. These extraction means may comprise two TPB⁻ ion destruction reactors 60, 60', and a feed dispenser 56 for these destruction reactors. Alternate operation of the two reactors supplied alternately by this feed dispenser allows for continuous treatment of the precipitates derived from the first and third outlets of the first and second separating units respectively.

The precipitation reactors and the filtration means are described above and in the following examples.

The device may also comprise means with which the top part of the equipment of the first, and in the first variant of the second separating units, can be swept by a flow of gas such as nitrogen or air optionally supplemented with nitrogen. It may also comprise vents to allow evacuation of the benzene formed by radiolysis and the various chemical degradation processes of the TPB (under the action of the catalyst) in the separating units and in the destruction reactors.

The device may also comprise means for treating the benzene recovered through the vents, for example an incinerator.

Other characteristics and advantages will become apparent on reading the following description and examples which are evidently given by way of illustration and are non-restrictive, with reference to the appended figures.

EXAMPLES

1) Examples of Embodiment of the Method
   i) Type of Waste
   The waste is an alkaline solution having the following average composition:

| | |
|---|---|
| $Na^+$ = | 4 M |
| $K^+$ = | 0.011 M |
| $OH^-$ = | 1.36 M |
| $NO_3^-$ = | 1.55 M |
| $NO_2^-$ = | 0.36 M |
| $AlO_3^-$ = | 0.22 M |
| $CO_3^{2-}$ = | 0.11 M |
| $SO_4^{2-}$ = | 0.11 M |
| $Cs^+$ = | $1 \times 10^{-4}$ M, 0.4 Ci $^{137}Cs/l$ |

This composition may vary in relatively high proportions ranging reaching an order of magnitude on some species such as K and Cs for example. During the storage of this waste, the pH is generally maintained above 14 in order to prevent precipitation of the aluminium.

ii) Principle of Pre-Treatment Using Monosodium Titanate

Insoluble monosodium titanate (MST) adsorbs strontium and the transuranium elements to form scarcely soluble co-precipitates.

It is added to the tank for preparing the feed load (sodium waste) after acquiring knowledge of the characteristics of this load, in particular of the concentrations of strontium and transuranium elements in activity. The quantity of MST added is in the order of 0.2 to 0.4 g/l. The stay time after the addition of MST to the tank, maintained under stirring, is 3 days or more.

With this stay time it is possible to reach the objectives of the desired Sr and Pu decontamination factors of approximately 150 iii) Principle of Caesium and Potassium Separation

The tetraphenylborate ion brought by the sodium tetraphenylborate reacts with the potassium and caesium to form scarcely soluble precipitates.

The equations involved are the following:

$$Cs^+ + TPB^- \rightleftharpoons CsTPB$$
$$K^+ + TPB^- \rightleftharpoons KTPB$$
$$Na^+ + TPB^- \rightleftharpoons NaTPB$$

The ratios of the solubility products of the different salts of the tetraphenylborate ion are $1:2\times10^{-8}: 1.9\times10^{-9}$ respectively for the $Na^+$, K and $Cs^+$ ions, which makes it possible to precipitate $K^+$ and $Cs^+$ without quantitatively precipitating $Na^+$.

The $K^+$ ion being in a ratio of 100 to 1 with the $Cs^+$ ion and these ions being close in nature, the precipitation of KTPB may serve to bring about that of CsTPB, which leads to reaching very high Cs decontamination levels.

Figure 3:
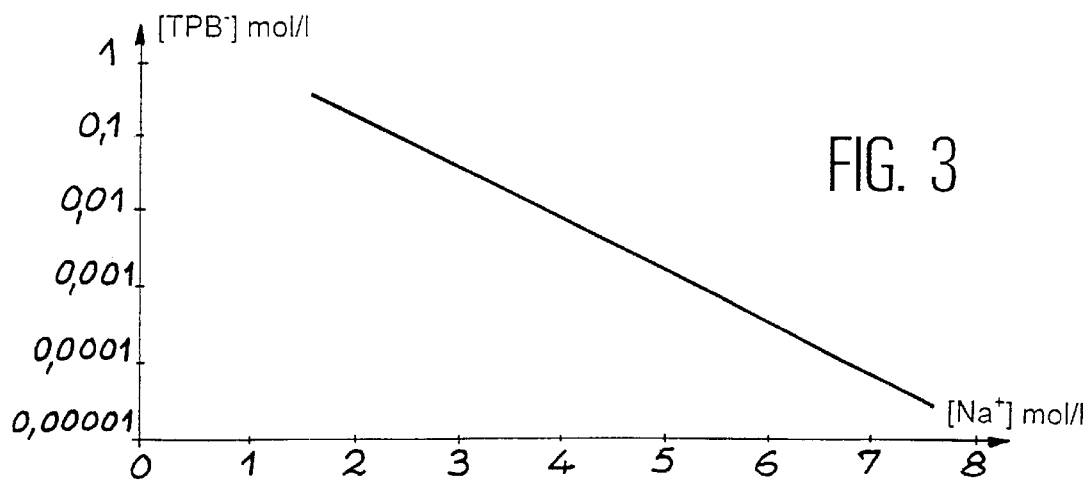
FIG. 3 is a graph illustrating the solubility in mole/l of TPB⁻ in relation to the concentration in mole/l of Na⁺ in a solution.

The solubility of NaTPB is the waste decreases as the $Na^+$ concentration increases. This is demonstrated in appended FIG. 3 in which the x-axis represents the concentration of $Na^+$ in mole/l and the y-axis represents the concentration of soluble $TPB^-$.

The application of the method without the precipitation of this salt is therefore not problem-free. The minimum quantity of $TPB^-$ to be added, having regard to the stoicheiometry of the formation reactions of the KTPB and CsTPB precipitates, may be $2\times10^{-2}$ M for the average composition given above. Any significant excess in stoicheiometry at the time the reagent is added will therefore lead to precipitation of NaTPB. The adjustment of the quantity of NaTPB to be added is made using the results of the analysis and measurements of the solutions (waste and liquid phases) made in line.

The rate of precipitation is dependent upon the soluble fraction of NaTPB. In order to obtain an acceptable rate, the initial waste which may contain up to 7M $Na^+$, may be diluted down to a $Na^+$ concentration close to the one mentioned in paragraph 1.i) above. Under these conditions, with an excess of NaTPB of 50% or less, for an initial solution with 4 M $Na^+$ and a temperature of between 20° C. and 30° C., a stay time of between 30 minutes and two hours can lead to attaining a decontamination factor of more than 1000.

iv) Device for Implementing the Method

A device for implementing the method of the invention is shown in the diagram in FIG. 1.

It comprises two feed tanks 2, 2', having a volume calculated to ensure the capacity of one week's feed, each comprising inlet means 4, 4' to add the sodium waste to the tank, inlet means 14, 14' to add an insolubilising agent to the tank, evacuation means 6, 6' to evacuate the content of the tank for the continuous supply of a first separating unit E1, and means for the mechanical homogenisation of the waste in tank 10, 12 and 10', 12'.

First analysis means 8, 8' to analyse the content in the waste of sodium, caesium, potassium, strontium and transuranium elements are positioned so as to analyse the solution in the tanks.

The first separating unit E1 comprises a first thermostat controlled precipitation reactor 16 having a volume corresponding to a stay time of between 30 minutes and two hours, and a vacuum rotating-drum filter 26. The precipitation reactor 16 comprises mechanical stirring means 20, 22 and an inlet 18 for the continuous addition of NaTPB to the reactor 16. It also comprises a duct 24 through which the second suspension is evacuated by overflow towards the rotating-drum filter 26. The second suspension falls under gravity into a sealed chute (not shown) which supplies filter 26. Filter 26 comprises, firstly, a first outlet 28 for the continuous evacuation of the precipitate(s) separated by the first separation treatment, and secondly a second outlet 30 for the continuous evacuation of the second liquid phase derived from the first separation treatment.

First measurement means 32 to measure the content of caesium in the second liquid phase are positioned downstream from the first separation unit E1 and upstream from a second separating unit E1a, in such manner as to analyse the second liquid phase derived from the first separation treatment.

The second separating unit E1a comprises a second thermostat controlled precipitation reactor 38 having a volume corresponding to a stay time of between 30 minutes and two hours, and a vacuum rotating-drum filter 48.

The precipitation reactor 38 of this unit E1a comprises mechanical stirring means 42, 44 and an inlet 40 for the continuous addition of NaTPB to reactor 38. It also comprises a duct 46 through which the third suspension is evacuated by overflow towards the rotating-drum filter 48. The third suspension falls under gravity into a sealed chute (not shown) which feeds the filter 48. Filter 48 comprises firstly a third outlet 50 for the continuous evacuation of the precipitate separated by this second treatment, and secondly a fourth outlet 52 for the continuous evacuation of the third liquid phase derived from this second treatment.

Second measurement means 54, are positioned downstream from the second separating unit E1a in such manner as to analyse the third liquid phase derived from the fourth outlet 52, that is to say from the second separation treatment.

Adjustment means (not shown) are connected to the analysis means and to the first and second measurement means. They use the results of the analyses and measurements to adapt pre-treatment, and the first and second separation treatments. These adjustment means are automatic; in relation to the analysis results and first and second measurements of caesium 8 or 8', 32, 54 they can adjust the continuous addition of NaTPB to the precipitation reactors 16, 38.

Barometric guards 34 are placed downstream from the vacuum rotary filters 26, 48.

The reactors 16, 38 and filters 26, 48 also comprise vents 19, 25 and 47 to collect the benzene formed by degradation of NaTPB. These vents lead the most part of the benzene towards an incinerator (not shown) for its destruction.

The crown of the separating units E1, E1a and of the different equipment containing $TPB^-$ is swept by a flow of an air/nitrogen mixture to prevent the accumulation of benzene formed by degradation of the $TPB^-$ (not shown).

In the rotating-drum filter of the first and second separating units, the precipitate formed by the insolubilising agent bound to the strontium and transuranium elements, if present, and by the $TPB^-$ bound to the caesium, potassium and a fraction of the Na corresponding to the insoluble NaTPB, is dried, washed, collected on a filtering cloth, freed and then falls into a chute leading to the feeding device for the destruction reactors 60, 60' of the tetraphenylborate ion. The chute may be fed with a small flow of water to carry the precipitate towards the feed device of the destruction reactors.

Figure 2:
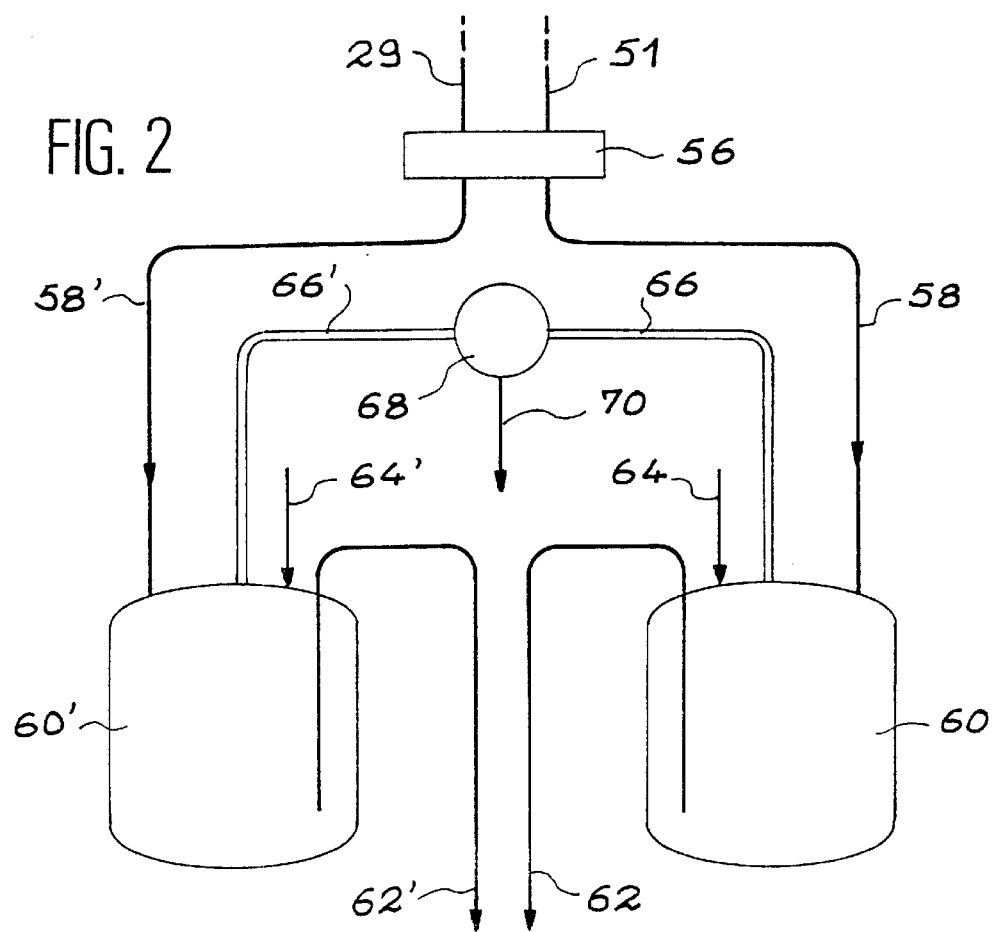
FIG. 2 is a diagram of means to extract caesium bound to TPB⁻.

With reference to FIG. 1 and FIG. 2, the first and third outlets 28, 50 for the products separated in E1 and E1a respectively, that is to say for the MST precipitate bound to the strontium and transuranium elements if present, and for the TPB⁻ precipitate bound to the caesium, potassium and a fraction of Na⁺ corresponding to the insoluble NaTPB, are connected to a feed dispenser 56 intended to dispense said precipitates alternately via ducts 58, 58' into two destruction reactors 60, 60' for the TPB⁻ ion, which operate in alternate manner for the continuous treatment of the precipitates.

The two destruction reactors 60, 60' for the TPB⁻ ion are fitted with inlets 64, 64' for the addition of the destruction reagents of the TPB⁻ ion, and with two ducts 62, 62' for the evacuation of the separated elements, in particular the caesium, potassium, strontium and transuranium elements bound to the MST, if they are present. They are also fitted with two vents 66, 66' to evacuate the benzene formed by the destruction of the TPB⁻ in the reactors, with a condenser 68 and a duct 70 to carry the benzene towards an incinerator (not shown).

Duct 55 connected to the fourth evacuation outlet of E1*a* is used to bring the third liquid phase towards a device for the destruction of NaTPB and its degradation products soluble in this solution (not shown).

This device enables continuous treatment of the waste to be treated. Also, with the measurements and adjustment means, it provides retroactive type control over the addition of NaTPB to the precipitation reactors. The technology of the precipitation reactors and rotary filters used provides for the separation, evacuation and destruction of the CsTPB precipitate as soon as it is formed, and for optimum efficacy of precipitation, filtration and temperature control in the reactors.

The volume and arrangement of the precipitation reactors, filtration means, destruction reactors and their connections make it possible to limit the stay time of the degradable precipitate containing TPB⁻.

The capacity of the device also makes it possible to limit the extensive gas release of benzene.

v) Operating Conditions stay time in the feed tanks: 7 days,
temperature of the waste in feed tanks 2, 2': ambient
quantity of waste in each tank: 500 m³,
quantity of MST added to each tank: 0.2 to 0.4 g/l,
temperature in the precipitation reactors 16, 38 of the first and second separating units E1, E1*a*: between 20 and 30° C.,
NaTPB concentration at the inlets 18, 40 for the continuous addition of NaTPB: 0.6 M, and rate of NaTPB addition corresponding to a TPB⁻ excess of 50% relative to the stoicheiometry,
Continuous precipitation in reactor 16, 38 under perfect stirring, stirring speed between 200 and 1000 r/min.,
Stay time in reactors 16, 38: 30 minutes to 2 hours,
continuous filtration through rotating-drum filter operating under residual pressure of 0.4 to 0.6×10⁵ Pa,
destruction reagents of the TPB⁻ ion in destruction reactors 60, 60': formic acid and copper.

vi) Method of the Prior Art

Results

Implementation at Savannah River in 1995:

batch of approximately 1500 m³ in a 4900 m³ tank, stay time in the precipitation tank more than 1 month (including a concentration phase),
filtration by tangential ultrafiltration conducted on the precipitation tank: in situ concentration up to 4% of solids in suspension (620 m³)
non-adjusted temperature: 35 to over 50° C.,
degradation of the tetraphenylborate leading to 8500 kg of benzene over 5 months,
agitation by recirculation,
NaTPB excess of 30%,
NaTPB weight results in batch (excluding decomposition):
80 500 moles added NaTPB
47 600 moles precipitated KTPB
60 moles precipitated CsTPB
5 700 moles soluble TPB⁻
27 140 moles precipitated NaTPB
therefore a minimum weight of precipitate involved in the filtration circle: 25 tonnes.

vii) Conclusion

The observations given below apply to the implementation of the method of the present invention in the preceding examples between the first separating unit and the feed dispenser for the destruction reactors.

When a comparison is made between the method according to the invention and that of the prior art, it is made for an identical production capacity.

Upstream from the destruction reactors, the tetraphenylborate ion inventory, in terms of a potential source of release of benzene and other aromatic products, is lower than that of the prior art described above, and in general than of any other implementation previously described for this process. This is due to the following particular aspects of the invention.

Having regard to the separating units:

Firstly, the volume of the installations effectively occupied by the salts, whether soluble or not, of the tetraphenylborate ion is smaller than that of the installations of any other implementation previously described for this process. The volume of the two precipitation reactors used is much smaller than that of a single reactor for CsTPB precipitation and adsorption of the strontium and transuranium elements, owing to the fact that the required stay time in this single reactor for the adsorption of the strontium and transuranium elements is well above twice the optimum stay time required for the precipitation of the CsTPB.

Secondly, precise knowledge of the concentration of caesium and other metals likely to be precipitated by the tetraphenylborate ion in the feed, the possible distribution of caesium decontamination between two devices, and finally the adjustment of the NaTPB flow by means of measuring the quantity of radioactive caesium in the liquid phases during the first and optionally the second measurements in accordance with the present invention all contribute to minimising the concentrations of TPB ions to the strict necessary minimum.

To conclude, the TPB⁻ ion inventory with the method of the present invention is considerably smaller than with the devices of the prior art.

Regarding the filters:

The TPB⁻ ion inventory in these installations is made up almost entirely by the layer of precipitate deposited on a semi-circumference of cloth or filtering medium of a rotary filter. This quantity is several orders of magnitude lower than that in suspension in the circle of tangential filtration.

The gravitational organisation of the transfers between the equipment which groups the flows of tetraphenylborate precipitate according to the present invention guarantees that the TPB⁻ inventory is minimal in the entire installation between the first separating unit and the feed dispenser for the destruction reactors.

The foregoing facts show that the total quantity of TPB⁻ ions present in the whole installation according to the present invention is lower than that present in any other installation currently used.

In the event of standstill of the installation, the maximum quantity of benzene and other aromatic products which may be formed is much below that which can be formed in the installations or processes of the prior art.

In this example, it has been shown that the volumes of the installations required to implement the invention are smaller than those of any other installation previously used or described. Therefore, it arises that the actual production of benzene and other aromatic compounds in the device of the invention is smaller than in any other installation previously used or described.

The small size of the equipment and its connection via sealed chutes and hydraulic guards give control over the composition of the atmosphere in this equipment so as to guarantee that an explosive mixture of oxygen and benzene never occurs, for example by means of circulating an inert gas, or by maintaining a sufficient flow of air in the reactors.

Under normal operation, the production of benzene and other aromatic compounds is limited to very low values on account of the method of the invention, and ventilation gives sufficient dilution of these compounds and hence guarantees that the atmosphere of the installations remains far removed from the explosive domain. The method of the invention imparts a large capacity to the device which makes it possible to group together the ventilation gases for their treatment in a single installation, which may be of moderate size taking into account the moderate flow of sweeping gases for which the targeted purification level is limited owing to the low initial benzene content in these gases.

Other advantages of the present invention are further apparent in the following incidental situations, in which the occurrence of one single failure is taken into account:

installation stopped unexpectedly, equipment full: the ventilation provides for indefinite evacuation of the benzene produced while remaining within a non-explosive domain; if necessary the flow rate or even the nature of the ventilation gases may be modified;

ventilation unexpectedly stopped (if no emergency ventilation is installed): the low inventory of matter in the equipment means that, by stopping the feed of waste and NaTPB and by maintaining a flow of a non-radioactive aqueous solution, it is possible to drain the installation of the caesium and TPB⁻ ions it contains.

In the event of the non-detected presence of a TPB⁻ decomposition catalyst: an increase in the ventilation rate or a change in the type of sweeping gas will permit treatment of the initial phase of the incident and the available possibility of rapidly draining the equipment of the caesium and TPB⁻ ions it contains will enable the incident to be settled.

An accident situation requires the occurrence of a twofold failure. Even in this case, with the method of the invention, the limited inventory of matter both in respect of caesium and of the TPB⁻ ions limits the potential consequences to a level of gravity below that which could be reached by processes currently used.

What is claimed is:

1. Method for separating cesium, strontium and transuranium elements contained in sodium waste, comprising the following successive steps:

(a) filling at least one of two feed tanks with the sodium waste, (b) analyzing the content of cesium, sodium, strontium and transuranium elements in the waste, (c) pretreating the waste, the pretreating consisting of, in one of the feed tanks filled with the waste, mixing said waste with an insolubilising agent for strontium and transuranium elements in a quantity based on the analysis of step b), mixing being conducted for a first time and at a first temperature that are adequate to insolubilise to strontium and transuranium elements, to form a first suspension, (d) an optional separation step to separate, from the first suspension, the insolubilising agent bound to the strontium and transuranium elements and to obtain a first liquid phase, free of said insolubilising agent, containing the cesium and sodium in solution, (e1) a first, continuous cesium separation treatment on the pre-treated waste from step c) or on the first liquid phase from step d), consisting of:

firstly, mixing in a first precipitation reactor said first suspension, or said first liquid phase, with tetraphenylborate ion in a quantity based ante analysis of step b) and to a first measurement of the cesium content made at step f1) downstream from this first separation treatment, mixing being conducted for a second time and at a second temperature that are adequate to precipitate the cesium, present in the first suspension or in the first liquid phase, with the tetraphenylborate ion and to limit the degradation of the tetraphenylborate iota, so as to obtain a second suspension containing, in suspension in a second liquid phase, insoluble tetraphenylborate ion containing the tetraphenylborate ion bound to the cesium, and if present the insolubilising agent bound to the strontium and transuranium elements, and secondly, separating from the second suspension the insoluble tetraphenylborate ion containing the tetraphenylborate ion bound to the cesium, and if present the insolubilising agent bound to the strontium and transuranium elements, to obtain the second liquid phase, said first precipitation reactor being continuously supplied with tetraphenylborate ion and with the first suspension or first liquid phase through alternate use of the feed tanks far said supply, (f1) measuring the cesium content in said second liquid phase, (g) recovery of the insoluble tetraphenylborate ion containing the tetraphenylborate ion bound to the cesium, and if present of the insolubilising agent bound to the strontium and transuranium elements derived from the preceding steps, and optionally (h) extraction treatment of the cesium bound to the recovered tetraphenylborate ion.

2. Method according to claim 1 also comprising, between steps (f1) and (g), the following steps:

(e1a) a second continuous cesium separation treatment made on the second liquid phase derived from step e1) consisting of:

firstly, mixing in a second precipitation reactor said second liquid phase with tetraphenylborate ion in a quantity based on the first measurement of step f1) and to a second measurement of the cesium content made at step f1a) downstream from this second separation treatment mixing being conducted for a third time and at a third temperature that are adequate to precipitate the cesium, present in the second liquid phase, with the tetraphenylborate ion so as to obtain a third suspension containing, in suspension in a third liquid phase, the insoluble tetraphenylborate ion containing the tetraphenylborate ion bound to the cesium, and secondly, separating from the third suspension the insoluble tetraphenylborate ion containing the insoluble tetraphenylborate ion containing the tetraphenylborate ion bound to the cesium, to obtain said third liquid phase, said second precipitation reactor being continuously supplied with tetraphenylborate ion and with the second liquid phase derived from the first separation treatment, and (f1a) said second measurement of the cesium content in said third liquid phase.

3. Method according to claim 1 or 2, in which the TPB⁻ is added in NaTPB form.

4. Method according to claim 1 or 2, in which the insolubilising agent is chosen from among a titanate, a zeolite, a sulphate or a mixture thereof.

5. Method according to claim 1 or 2, in which the insolubilising agent is monosodium titanate.

6. Method according to claim 1 or 2, in which at step b) the waste is homogenised before being analysed.

7. Method according to claim 1 or 2, in which at step e1) the first cesium treatment is conducted on the first suspension derived from step c).

8. Method according to claim 1 or 2, in which at step e1) the separation of the insoluble tetraphenylborate ion containing the tetraphenylborate ion bound to the cesium, and if present of the insolubilising agent bound to the strontium and transuranium elements, from the second liquid phase is made by filtration.

9. Method according to claim 2, in which at step e1a) the separation of the insoluble TPB⁻, containing the TPB⁻ bound to the caesium, from the third liquid phase is made by filtration.

10. Method according to claim 8, in which filtration is conducted with frontal filtration means.

11. Method according to claim 9, in which filtration is conducted with frontal filtration means.

12. Method according to claim 8, in which filtration is conducted by means of a rotating drum filter.

13. Method according to claim 9, in which filtration is conducted by means of a rotating drum filter.

14. Method according to claim 1, in which the second time is from 30 minutes to 4 hours.

15. Method according to claim 1, in which the second temperature is from 20 to 50° C.

16. Method according to claim 1 or 2, in which extraction treatment of the cesium bound to the tetraphenylborate ion recovered at step g) comprises destruction of the tetraphenylborate ion.

17. Method according to claim 1 or 2, in which if the sodium waste also contains potassium and/or mercury, the quantity of tetraphenylborate ion is also based on these elements.

18. Method according to claim 1 also comprising, between steps (f1) and (g), a step e1a) separating the cesium from the second liquid phase with an adsorption treatment on an ion exchanger.

* * * * *

UNITED STATES PATENT AND TRADEMARK OFFICE
CERTIFICATE OF CORRECTION

PATENT NO. : 6,517,788 B2
DATED : February 11, 2003
INVENTOR(S) : Marie-Francoise Debreuille et al.

It is certified that error appears in the above-identified patent and that said Letters Patent is hereby corrected as shown below:

Column 9,
Line 14, please delete "K", and insert therefor -- $K^+$ --.

Column 16,
Line 30, please insert the following claims:
    19. Method according to claim 2, in which the third time is from 30 minutes to 4 hours.

20. Method according to claim 2, in which the third temperature is from 20 to 50º C.

Signed and Sealed this

Twenty-ninth Day of July, 2003

JAMES E. ROGAN
*Director of the United States Patent and Trademark Office*